United States Patent [19]

Thomas

[11] 4,358,129
[45] Nov. 9, 1982

[54] TRACTOR WITH A BUILT-ON UNDERFRAME FOR A TILLING MACHINE WITH ARM

[76] Inventor: Joris J. Thomas, Brusselsesteenweg 134, B - Merchtem, Belgium

[21] Appl. No.: 180,564

[22] Filed: Aug. 25, 1980

[30] Foreign Application Priority Data

Sep. 7, 1979 [BE] Belgium .............................. 2/58054

[51] Int. Cl.³ .............................................. B60D 1/14
[52] U.S. Cl. ................................... 280/473; 172/274; 280/456 A; 280/476 R
[58] Field of Search .................... 280/473, 472, 456 R, 280/456 A, 460 R, 460 A, 476 R, 155; 172/273, 274, 297, 298, 98

[56] References Cited

U.S. PATENT DOCUMENTS

| | | | |
|---|---|---|---|
| 2,707,643 | 5/1955 | Nelson | 280/456 A |
| 2,826,430 | 3/1958 | Nelson | 280/456 A |
| 3,117,632 | 1/1964 | Caggiano, Jr. | 172/98 |
| 4,277,080 | 7/1981 | Smith et al. | 280/473 |

FOREIGN PATENT DOCUMENTS 226465  8/1962  Austria ................................ 280/473

Primary Examiner—Joseph F. Peters, Jr.
Assistant Examiner—Donn McGiehan
Attorney, Agent, or Firm—Stevens, Davis, Miller & Mosher

[57] ABSTRACT

The back part of the underframe is fastened to the center point of the three-point lift of the tractor by an eye-bolt the shaft of which is rotatable mounted on said part.

The side part of the underframe is comprised of a part which bears a wheel on the ground and carries a bearing for the arm of the tilling machine, an extension piece and a connection piece, lockable in several positions to the extension piece and hingably fastened by a pin and a fastening piece to the tractor adjacent the engine.

The complete underframe can tilt relative to the tractor about the hinging axes formed by the eye-bolt and the pin, extending in the lengthwise direction of the tractor.

Even with a height differential between the wheel and the tractor no large turning moment can be generated in the underframe or its fastening.

2 Claims, 6 Drawing Figures

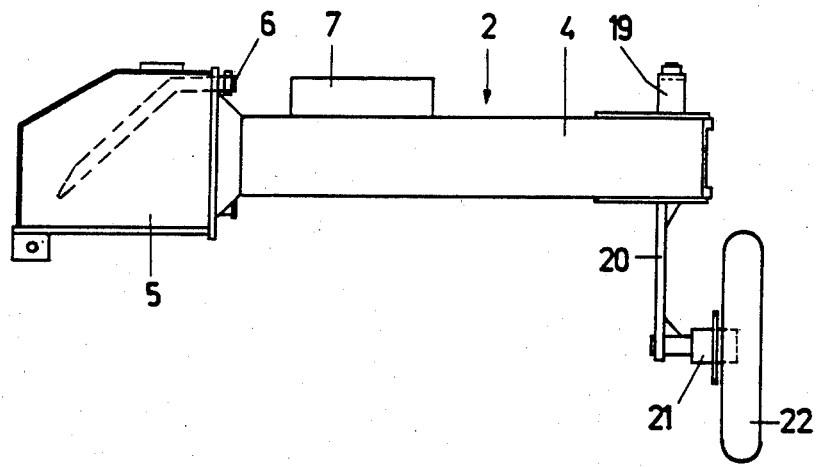
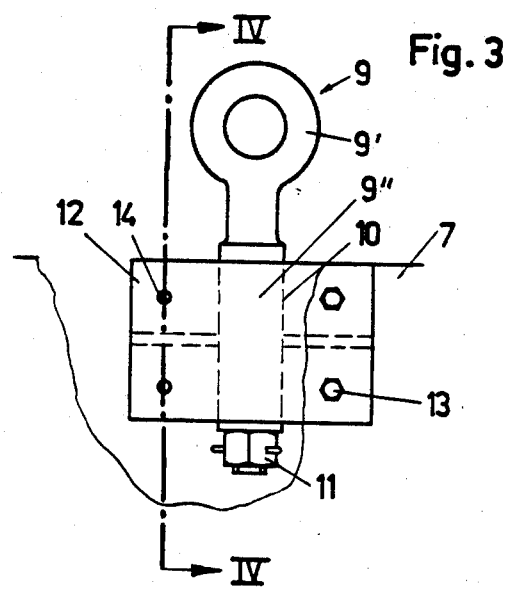
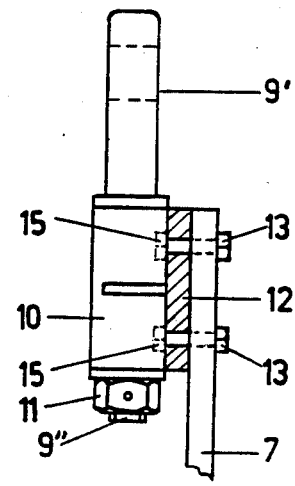

TRACTOR WITH A BUILT-ON UNDERFRAME FOR A TILLING MACHINE WITH ARM

BACKGROUND

This invention relates to a tractor with a built-on underframe for a tilling machine with arm, which underframe has a back part which runs behind the tractor, in a cross-wise direction and is fastened to the tractor back side, and a sidewise part which runs along the one tractor side along the tractor, the back end thereof connecting to the back part and the front end thereof being fastened to the tractor opposite the engine. The underframe further comprises means for mounting the tilling machine arm on the sidewise part, and a wheel which is mounted on the sidewise part and bears on the ground.

In tractors with such an underframe, the tilling machine has a foldable arm which is swingable about a vertical axis relative to the underframe, the arm movements being controlled by hydraulic or pneumatic piston mechanisms, and an implement at the arm end, such as a pull shovel, a ditcher beam, a knife mower, a mowing basket, a beater harvester, a slope rake, or a brush.

While the arm is removably or not fastened to the underframe, the implement proper is generally removably made fast to the arm, in such a way that various implements can be mounted succeedingly on one and the same arm.

The arm extends as the implement is working sidewise relative to the tractor, in such a way that special dispositions have to be provided to prevent the tractor from overturning, the tractor moreover generally being ridable during such working.

In the known tractors of this kind, both the sidewise part and the back part of the underframe are born by a wheel on the ground, while the sidewise part is positively made fast at the front to the tractor frame, and the back part is made fast to the three points from the tractor three-point lift and is thus also positively made fast.

In this way the tractor overturning is substantially opposed, except where large turning moments around the left rear wheel are present as the underframe and the fastenings thereof on the tractor. This is for example the case when the underframe wheel bearing on the ground lies much higher than the tractor wheels. Such height differential cannot always be balanced completely by a possible spring mounting of the wheel on the underframe.

The invention has for an object to obviate said drawback and to provide a tractor with a built-on underframe for a tilling machine with arm, whereby the underframe has a simple structure, but no large turning moment around the left rear wheel can be generated in the underframe or in the fastening thereof to the tractor, even on rough ground.

THE INVENTION

For this purpose the back part of the underframe is fastened but in one location on the tractor back side and actually with a hinged connection which lets the part tilt relative to the tractor about an axis which runs front to back, while the front end of the sidewise part is also fastened to the tractor with a hinged connection which also lets the part tilt about an axis which runs front to back, in such a way that the complete underframe can tilt relative to the tractor about both the hinged connections.

In a particular embodiment of the invention, the underframe bears in three locations only, namely through hinged connections on the front and back of the tractor, and through one wheel on the ground next to the tractor.

In a noteworthy embodiment of the invention, the hinged connection of the underframe back part to the tractor back side lies in the center of the back side.

Usefully the hinged connection of the sidewise part to the tractor front side lies as close as possible to the lengthwise plane passing through the tractor center.

In a preferred embodiment of the invention, the hinge axes of both hinged connections lie in parallel relationship with one another.

Other details and advantages of the invention will stand out from the following description of a tractor with a built-on underframe for a tilling machine with arm, according to the invention; this description is only given by way of example and does not limit the invention; the reference numerals pertain to the accompanying drawings, in which:

DRAWINGS

FIG. 2 is a back view of the underframe as shown in FIG. 1.

FIG. 3 shows a detail from the top view of the tractor in FIG. 1, on a larger scale.

FIG. 4 shows a cross-section along line IV—IV in FIG. 3.

In the various figures, the same reference numerals pertain to similar elements.

DESCRIPTION OF A PREFERRED EMBODIMENT

Figure 1:
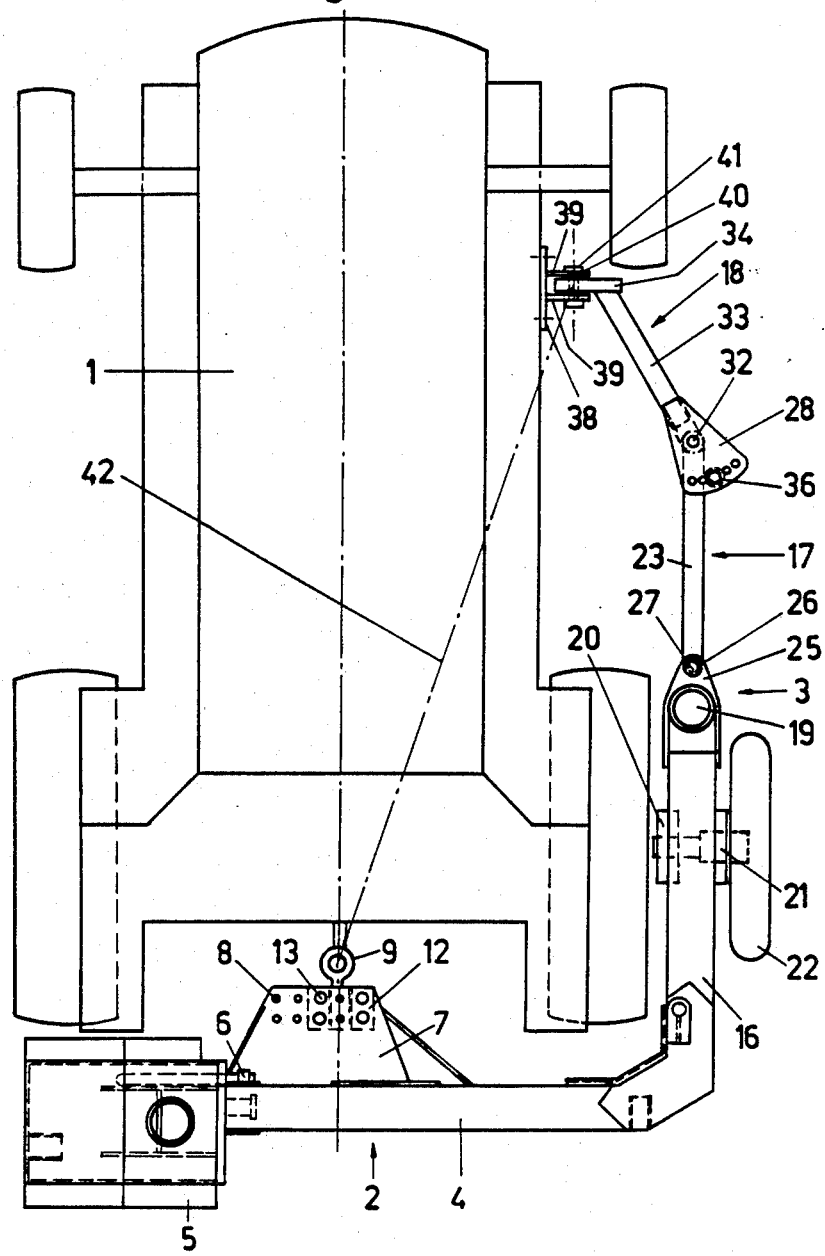
FIG. 1 is a top view of a tractor with a built-on underframe for a tilling machine with arm according to the invention.

The tractor 1 according to FIG. 1 is of a structure known per se. The tractor is consequently shown diagrammatically in the figure and will not be described in detail hereinafter.

On the tractor is built an underframe which is mainly comprised of a back part 2 and a sidewise part 3. The underframe is designed to bear an arm which is foldable by means of hydraulic piston mechanisms, the arm being part of a tilling machine with is available commercially per se and has not been shown in the drawings for the sake of clearness.

The back part 2 of underframe 2, 3 comprises essentially a hollow metal beam 4 with square cross-section which runs cross-wise to the tractor. One end of the beam 4 is rigidly connected to the sidewise part 3. The other end of the beam 4 is connected to an oil tank 5 to which the hydraulic piston operating from the tilling machine can be connected by means of hoses. For the sake of clearness the hoses have not been shown in the figures. The oil tank 5 is provided with a manifold 6 for the fastening of the hoses.

Between part 3 and oil tank 5, a flange 7 projecting towards tractor 1 is welded to the top side of beam 4. The flange 7 is provided with openings 8. To the flange 7 is hingably fastened an eye-bolt 9. The eye-bolt 9 with a shank 9″ is rotatably fitted in a bush 10. An overthickness on one end of the shank 9" and a nut 11 which is screwed on the other end of the shank 9" prevent the shank 9" sliding inside bush 10. The bush 10 is welded to a flange 12. The flange 12 as it appears mostly from FIGS. 3 and 4, is made fast by means of four screw-bolts 13 passing through openings 14 in flange 12 and through four openings 8 in flange 7 and on which nuts 15 are screwed, against the bottom side of flange 7, in such a way that the eye 9' proper projects outside flange 7 on the side of tractor 1. The eye 9' proper is then made fast by means of a screwbolt or pin to the center point from the three-point lift of tractor 1. Those four openings 8 through which pass bolts 13 are so selected that the sidewise part 3 lies as close as possible to the side wall of tractor 1. The shank 9" from eye-bolt 9 forms a hinging axis about which beam 4 can tilt relative to the back side of tractor 1. The hinging axis runs in the lengthwise direction of tractor 1, that is at right angle to the lengthwise direction of beam 4 and in parallel relationship with the ground the tractor 1 runs on.

The sidewise part 3 is mainly comprised of three parts, namely a beam 16 which is integral with beam 4 and which runs in parallel relationship with the lengthwise axis of tractor 1, an extension piece 17 which runs substantially as on extension of beam 16 and which at its back end connects to the front end of beam 16, and a connecting piece 18 which runs from the front end of extension piece 17 at an angle up to tractor 1.

The beam 16 bears next to the front end thereof, on the top side thereof, a bearing 19 for the arm from the tilling machine to be mounted on underframe 2,3. The bearing 19 allows in a way known per se, a fast coupling of the arm with the underframe 2, 3, in such a way that the arm is not only rotatably mounted on beam 16, but is also easily removable and easily replacable thereon. The beam 16 further bears between the bearing 19 and the back end thereof, on the bottom side, an arm 20 running thereunder. To the lowermost end of arm 20 a wheel bearing 21 is made fast on which bears a wheel 22. With the wheel 22 beam 16 and thus the complete underframe 2, 3 bears on the ground. The wheel 22 actually forms the single direct support on the ground for underframe 2, 3.

The extension piece 17 comprises a hollow flat beam 23 to both ends of which are welded cylinders 24. The axes of cylinders 24 run at right angle to the lengthwise direction of beam 23. The extension piece 17 is arranged with the lengthwise axes of cylinders 24 approximately vertical. With the cylinder 24 on the back end thereof, the extension piece 17 projects between two legs 25 forming a fork which forms the front end of beam 16. Both legs are each provided with an opening 26. The extension piece 17 is connected to beam 16 by a pin 27 the ends of which are provided with an overthickness and which fits through the openings 26 in legs 25 and the latter cylinder 24.

Figure 5:
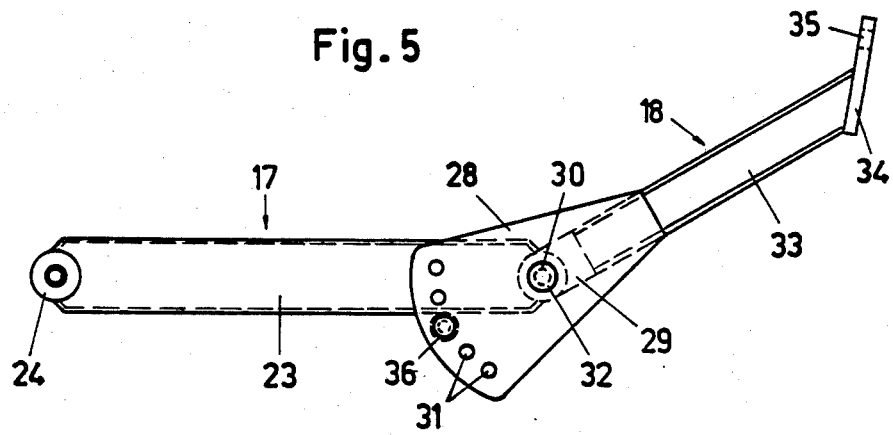
FIG. 5 shows another detail from the top view in FIG. 1, also on a larger scale.
Figure 6:
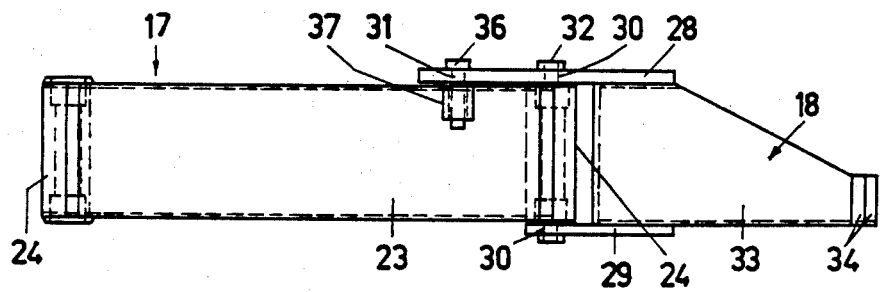
FIG. 6 is a side view of the detail shown in FIG. 5.

As is clear from FIGS. 5 and 6 wherein extension piece 17 and connecting piece 18 only have been shown, the extension piece 17 is connected to connecting piece 18 in the same way as described above. The connecting piece 18 also comprises a forked end. Both fork legs are shown as 28 and 29 in the figures. However top leg 28 is not only substantially longer than bottom leg 29, but also fans out wide. Openings 30 are provided facing one another in both legs 28 and 29, while in top leg 28 some five additional openings 31 are provided on a circle which is concentric to opening 30. With that cylinder 24 at the front thereof, the extension piece 17 projects between both legs 28 and 29 and a pin 32 the ends of which have an overthickness, passes through the openings 30 in legs 28 and 29 and through front cylinder 24.

To that forked end formed by legs 28 and 29 there is connected a hollow flat beam 33 which is chamfered on the front side and the top side. The connecting piece 18 comprises on the front side of flat beam 33, a fastening plate 34 welded thereto. Plate 34 extends at a right angle to legs 28 and 29 but forms an angle with the lengthwise direction of connecting piece 18. Plate 34 projects with a portion thereof outside beam 33. The latter portion is provided with an opening 35.

By means of fastening plate 34, the connecting piece 18 and thus the front end of underframe 2, 3 is made fast to the frame which bears said engine approximately in the location of the engine of tractor 1. As the tractor 1 is markedly smaller in width adjacent the engine than adjacent the rear wheels, the front end of connecting piece 18 lies closer to the tractor lengthwise axis than the beam 16 located adjacent the rear wheels of tractor 1.

The extension piece 17 and the connecting piece 18, which are normally hinged relative to one another about pin 32, are made fast to one another at an angle in such a way that extension piece 17 lies substantially as the extension of beam 16 and connecting piece 18 runs at an angle relative to the lengthwise direction of tractor 1. Such positive fastening at an angle to one another of extension piece 17 and connecting piece 18 is obtained by means of a removable pin 36 which has an enlarged head and which passes through one opening 31 and through a sleeve 37 welded to the side wall of hollow beam 23. According to that opening 31 which is selected, it is possible to adjust the angle formed between extension piece 17 and connecting piece 18, in such a way that underframe 2, 3 can be fitted to tractor 1 regardless of the model of tractor 1, the front end of connecting piece 18 being brought against the tractor.

To enable fastening the front end formed by fastening plate 34 connected to piece 18, a fastening piece comprised of a base 38 and two legs 39 standing at right angle thereon, is made fast to the tractor frame. The legs 39 are directed at right angle to the lengthwise direction of tractor 1 and run in perpendicular relationship with the ground. Each leg 39 is provided with an opening 40. The fastening plate 34 of connecting piece 18 fits exactly between both legs 39. The fastening is obtained by means of a pin 41 which passes through the openings 40 in both legs 39 and through the opening 35 in fastening plate 34. Pin 41 forms a hinged axis about which the connecting piece 18 and thus the complete underframe 2, 3, can tilt relative to tractor 1. The hinged axis runs in the lengthwise direction of tractor 1 in a parallel relationship with the ground.

Actually underframe 2, 3 is hingably connected by two hinging axes, namely eye-bolt 9 and pin 41, respectively to the back side and the front side of the tractor. Both hinging axes run in parallel relationship to the tractor lengthwise axis and the ground, but not in the extension of one another. The sidewise spacing between both hinged axes is however markedly smaller than the spacing thereof as considered in the lengthwise direction of tractor 1, in such a way that one may consider that the axes form by approximation a single hinging axis which runs substantially in the lengthwise direction of tractor 1 and about which the complete underframe 2, 3 is swingable relative to the tractor. Thus when bearing wheel 22 comes to lie higher or lower than the supporting plane of the wheels of tractor 1, the complete underframe 2, 3 can tilt somewhat relative to tractor 1 and thus the supporting plane thereof. The small side difference relative to one another of those hinged axes formed by eye-bolt 9 and pin 41 is easily balanced due to the connections between beam 16, extension piece 17, connecting piece 18 and fastening pieces 38, 39 not being rigid but rather allowing some play.

Besides, the hinge axes formed by eye-bolt 9 and pin 41 do not necessarily have to be directed along the tractor lengthwise direction. They might also lie in the extension of one another, that is along the connecting line 42 or take any direction which lies between line 42 and the lengthwise direction of tractor 1. The closer the line 42 lies to the tractor lengthwise direction, the better.

By means of the above-described structure, no large turning moments are generated in the underframe 2, 3 or in the connections between underframe 2, 3 and the tractor 1 even on rough ground.

I claim:

1. Tractor with a built-on underframe for a tilling machine with arm, which underframe comprises:
   (a) a back part which runs behind the tractor, in a crosswise direction and is pivotally fastened in but one location on the tractor back side, with a hinged connection said part being tiltable relative to the tractor about an axis which runs front to back,
   (b) a sidewise part having a front end and back end which extends along the side of the tractor, the back end thereof connecting to the back part and the front end thereof extending to opposite the tractor engine and being pivotally fastened to the tractor with a hinged connection, said part also being tiltable about an axis which runs front to back, in such a way that the complete underframe can tilt relative to the tractor about both said hinged connections, said sidewise part comprising at least two parts which are swingably fastened relative to one another about an axis running from bottom to top and means for locking both said parts in at least one position relative to one another,
   (c) means for mounting the tilling machine arm on said sidewise part, and
   (d) a wheel which is mounted on said sidewise part and bears on the ground.

2. Tractor as defined in claim 1, in which the sidewise part is comprised of three parts, namely a part which is fast to the back part, an extension piece which lies substantially in the extension of said first mentioned part, and a connection piece which is hingedly fastened to the extension piece, said connection piece being lockable in at least one position.

* * * * *